| United States Patent [19] | [11] Patent Number: 4,904,745 |
| Inoue et al. | [45] Date of Patent: Feb. 27, 1990 |

[54] POLYALKYLENE OXIDE HAVING UNSATURATED END GROUP AND NARROW MOLECULAR WEIGHT DISTRIBUTION

[75] Inventors: Shohei Inoue; Takuzo Aida, both of Tokyo; Michihide Honma; Katsuhiko Isayama, both of Kobe, all of Japan

[73] Assignee: Kanegafuchi Kagaku Kogyo Kabushiki Kaisha, Osaka, Japan

[21] Appl. No.: 170,571

[22] Filed: Mar. 14, 1988

Related U.S. Application Data

[63] Continuation of Ser. No. 842,588, Mar. 21, 1986, abandoned.

[30] Foreign Application Priority Data

Mar. 22, 1985 [JP] Japan .................................. 60-58745
Mar. 25, 1985 [JP] Japan .................................. 60-60221

[51] Int. Cl.$^4$ ..................... C08F 283/06; C07C 69/52; C08G 65/12
[52] U.S. Cl. .................................. 525/404; 528/416; 528/421; 560/224; 568/616
[58] Field of Search ................ 525/404; 528/416, 421; 568/616; 560/224

[56] References Cited

U.S. PATENT DOCUMENTS

| 3,951,888 | 4/1976 | Isayama et al. | 525/404 |
| 4,256,904 | 3/1981 | Riew | 528/421 |
| 4,393,199 | 7/1983 | Manser | 528/421 |
| 4,654,417 | 3/1987 | Inoue et al. | 528/416 |
| 4,722,978 | 2/1988 | Yu | 528/421 |
| 4,774,356 | 9/1988 | Inoue et al. | 568/616 |

FOREIGN PATENT DOCUMENTS

0008223 1/1982 Japan .................................. 528/416

OTHER PUBLICATIONS

Aida, et al., "Polymerization of Epoxides Catalysed by Metallaporphine" *Makromol. Chem.* vol. 182 pp. 1073–1079 (1981).

*Primary Examiner*—Wilbert J. Briggs, Sr.
*Attorney, Agent, or Firm*—Armstrong, Nikaido, Marmelstein, Kubovcik & Murray

[57] ABSTRACT

A polyalkylene oxide having unsaturated end groups. The polymer has a distribution of molecular weight Mw/Mn of not more than 1.5, and a process for the same. The polymer is useful as rubber materials, and can provide cured rubber having an excellent elongation.

1 Claim, 2 Drawing Sheets

POLYALKYLENE OXIDE HAVING UNSATURATED END GROUP AND NARROW MOLECULAR WEIGHT DISTRIBUTION

This application is a continuation of application Serial No. 842,588 filed Mar 21, 1986, now abandoned.

BACKGROUND OF THE INVENTION

The present invention relates to a polyalkylene oxide having an unsaturated group at its polymer end or ends, having any desired molecular weight, and having a narrow distribution of molecular weight.

There have been known polyalkylene oxides having unsaturated groups at both ends of the polymers. These polyalkylene oxides having unsaturated groups at their polymer ends are used as rubber materials by curing them alone, or are used as crosslinkable modifiers for blending with other polymers. Further, as disclosed in U.S. Pat. No. 3,971,751, polyalkylene oxides where unsaturated end groups are converted to other more active functional groups such as hydrolyzable silyl groups can be employed in various uses as a telechelic liquid rubbers.

In the polyalkylene oxides, polyoxypropylenes having an unsaturated end group can be prepared by using a polyoxypropylene obtained by a usual anion-polymerization in the presence of KOH as a starting material, converting the hydroxyl group of the polyoxypropylene to an alkoxide groups by using metal sodium and the like, and then reacting with a halogenated compound which contains an unsaturated group such as allyl chloride. According to the usual anion-polymerization in the presence of KOH catalyst, however, it is difficult to produce a polyoxypropylene having a narrow distribution of molecular weight. It is also difficult to produce a polyoxypropylene having a number average molecular weight of not less than 3,000, because chain transfer reaction occurs to the propagating chain end against propylene oxide monomer. Therrefore the particular process is required for producing a polyoxypropylene which has a number average molecular weight of not less than 3,000 and has unsaturated groups at its both ends. According to such a process, for example, as disclosed in U.S. Patent No. 3,951,888, a polyoxypropylene having unsaturated groups at its both ends is produced by converting the hydroxyl groups of a polyoxypropylene to alkoxide groups with metal sodium or the like, reacting with a polyhalogenated compound such as methylene chloride to increase the molecular weight, and then reacting with an active halogen-containing compound having an unsaturated group. It is difficult, however, to precisely prepare a polymer having a desired molecular weight according to those conventional processes. Further, the distribution of molecular weight of the polymer product becomes wide because the chain propagation reaction caused by the polyhalogenated compound occurs ununiformly. When using a polyalkylene oxide having a wide distribution of molecular weight, there is a problem that tensile properties of the cured produce are inferior.

The present inventors found that living polymerization of propylene oxide can be carried out by using a complex catalyst of the reaction product of an organoaluminium compound with a porphyrin compound, and that a polymer having a narrow distribution of molecular weight can be prepared according to such a process (T. Aida eta l, "Makromol. Chem." 182, 1073–1079 (1981). AS a result of the present inventors' further study, it has been found that when using the above new complex catalyst, a polyoxypropylene having unsaturated groups at its ends, and having any desired molecular weight, especially a relatively high molecular weight of not less than 4,000, and also having a narrow distribution of molecular weight can be easily prepared.

SUMMARY OF THE INVENTION

According to the present invention there can be provided a polyalkylene oxide having any desired molecular weight, especially a number average molecular weight of 4,000 to 20,000 and having a distribution of molecular weight (Mw/Mn) of not more than 1.5, which comprises a main chain consisting essentially of a recurring unit of the formula (I):

(I)

wherein $R^1$ is a monovalent group selected from the group consisting of hydrogen atom and a monovalent organic group of $C_1$ to $C_6$, and may be the same or different in the different recurring units, the main chain having an unsaturated end group of the formula (II):

(II)

wherein $R^2$ is a divalent organic group of $C_1$ to $C_8$, a is 0 or 1, and $R^3$ is hydrogen atom or methyl, in an amount of not less than 70 % of the total end groups.

The polyalkylene oxide can be prepared by polymerizing an alkylene oxide in the presence of a complex catalyst prepared by reacting an active hydrogencontaining compound with an aluminium porphyrin complex, and reacting with an active halogen-containing compound, the active hydrogen-containging compound being an organic compound selected from the group consisting of (a) an organic compound having an unsaturated group and an active hydrogen atom-containing group selected from hydroxyl group and carboxylic group in one molecule, and (b) an organic compound having at least two active hydrogen atom-containing groups selected from hydroxyl group and carboxylic group in one molecule, the aluminium porphyrin complex being prepared by reacting an organoaluminium compound and a porphyrin compound, and the active halogen-containing compound being an organic compound selected from the group consisting of (c) an organic compound having an active halogen atom and an unsaturated group in one molecule, and (d) an organic compound having at least two active halogen atoms in one molecule.

DETAILED DESCRIPTION

Figure 1:
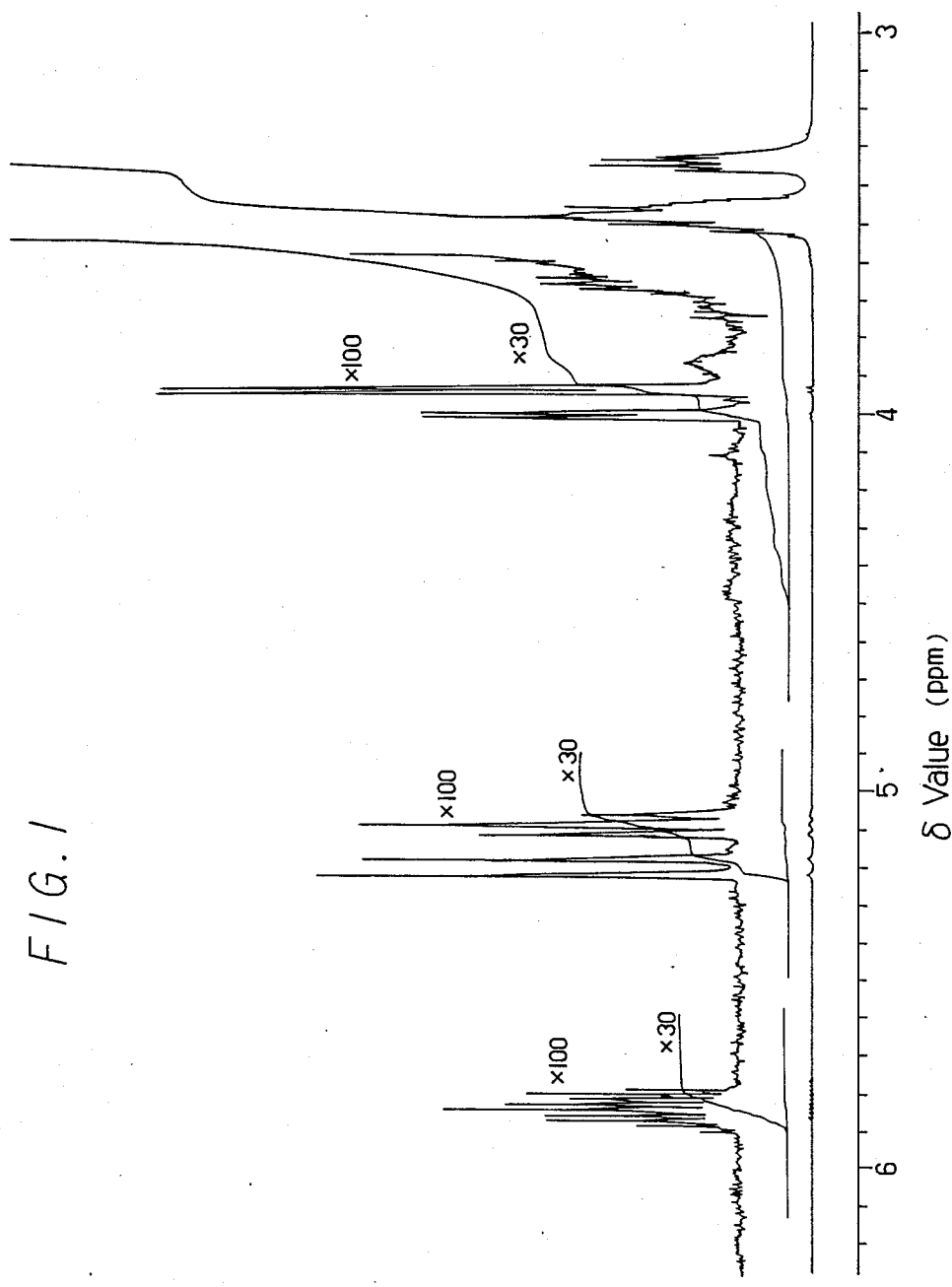
FIGS. 1 and 2 are $^1$H-NMR spectrum charts of the polypropylene oxides prepared in Examples 1 and 2, respectively.

The polyalkylene oxide of the present invention can be prepared by polymerizing an alkylene oxide in the presence of a reaction product of an aluminium porphyrin complex and an active hydrogen-containing compound, and then reacting the obtained polymer with an active halogencontaining compound.

The aluminium porphyrin complex can be prepared by reacting an organoaluminium compound with a porphyrin compound. Examples of the organoaluminium compound are, for instance, trialkylaluminiums having alkyl groups of $C_1$ to $C_4$ such as trimethylaluminium, triethylaluminium, tripropylaluminium and triisobutylaluminium; alkylaluminium hydrides having hydrogen atom and alkyl groups of $C_1$ to $C_4$ such as diethylaluminium hydride and disobutylaluminium hydride. Among then, the trialkylaluminium, particularly triethylaluminium is preferably employed.

The porphyrin compound is represented by the formula (III):

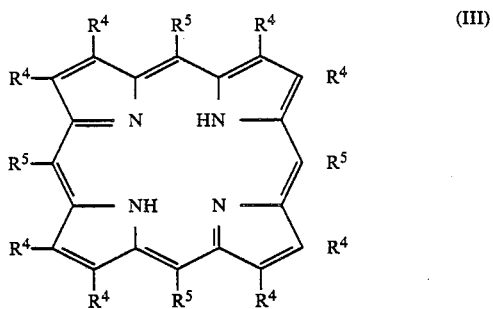

(III)

wherein $R^4$ are the same or different, and each is a monovalent group selected from hydrogen atom and an alkyl group of $C_1$ to $C_4$, $R^5$ is hydrogen atom or a monovalent hydrocarbon residue of $C_1$ to $C_{10}$. Examples of the porphyrin compound are, for instance, tetramethyltetraethylporphyrin, octaethylporphyrin, tetraphenylporphyrin, and the like. Among them there is preferably employed tetraphenylporphyrin ($R^4$: H, $R^5$: phenyl in the formula (III)).

The aluminium porphyrin complex (A) prepared by reacting the organoalumium compound with the porphyrin compound is represented by the formula (IV):

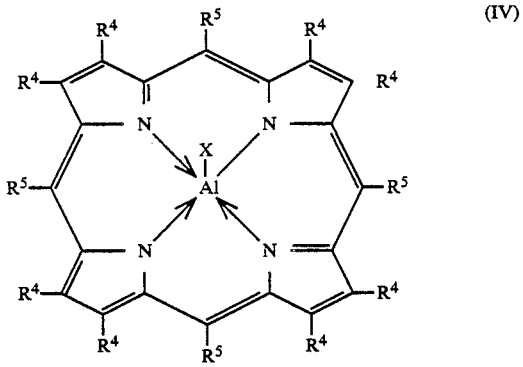

(IV)

wherein X is a group selected form hydrogen atom and an alkyl group of $C_1$ to $C_4$. The complex can be prepared by adding an equimolecular amount of the organoaluminium compound to the porphyrin compound in the presence of a solvent under an inert gas atmosphere such as nitrogen gas. As the solvent, there can be used hydrocarbons such as benzene, toluene and xylene; and halogenated hydrocarbons such as methylene chloride, chloroform and dichloroethane. When using triethylaluminium as the organoaluminium compound and using tetraphenylporphyrin as the porphyrin compound, it is presumed that the obtained aluminium porphyrin complex has the formula (V):

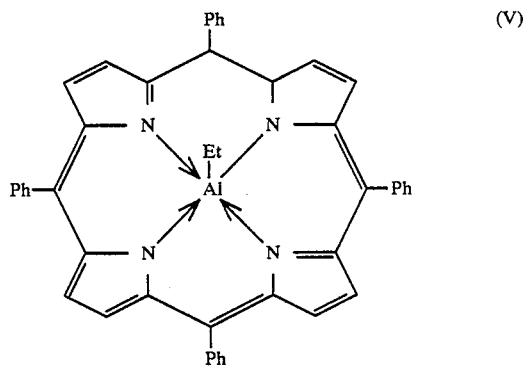

(V)

The aluminium porphyrin complex (A) is reacted with an active hydrogen-containing compound to prepare a complex catalyst (B) for polymerization of an alkylene oxide. As the active hydrogen-containing compound, there can be employed (a) an organic compound having both of an unsaturated group and an active hydrogen atom-containing group selected from hydroxyl group and carboxylic group in one molecule, or (b) an organic compound having at least two active hydrogen atom-containing groups selected from hydroxyl group and carboxylic group in one molecule. Examples of the compound (a) are, for instance, unsaturated aliphatic alcohols such as allyl alcohol, ethylene glycol monoallyl ether, 3-butenyl alcohol and 2-hydroxyethyl acrylate; unsaturated phenols such as vinylphenol and allyloxyphenol; unsaturated carboxylic acids such as acrylic acid and methacrylic acid; and the like. Examples of the compound (b) are, for instance, polyhydric alcohols such as triethylene glycol, tripropylene glycol, 2,2-bis(4-hydroxyphenyl) propane and glycerol; polycarboxylic acids such as adipic acid and sebacic acid; and the like. Among them the compound (a), particularly allyl alcohol or acrylic acid is preferably employed.

The complex catalyst (B) can be prepared by mixing the aluminium porphyrin complex (A) with an equivalent amount of the active hydrogen-containing compound. When using the complex of the formula (V) as the aluminium porphyrin complex and using allyl alcohol or acrylic acid as the active hydrogencontaining compound, it is presumed that the obtained complex catalyst has the following formula (VI):

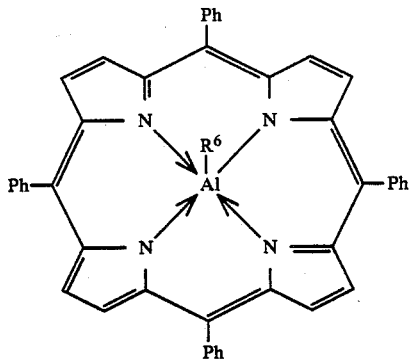

(VI)

wherein R⁶ is —OCH₂CH=CH₂ in case of allyl alcohol, and is

in the case of acrylic acid.

The alkylene oxide is polymerized by using the complex catalyst (B) under an inert gas atmosphere in the presence of or in the absence of a solvent. There is preferably employed nitrogen gas as the inert gas. Examples of the solvent are, for instance, hydrocarbons such as benzene, toluene and xylene; halogenated hydrocarbons such as methylene chloride, chloroform and dichloroethane; and the like. An amount of the solvent can be optionally selected. The polymerization reaction can be satisfactorily conducted at normal temperature, and also can be carried out with heating.

Examples of the alkylene oxide are, for instance, aliphatic alkylene oxides having epoxy group at the end such as ethylene oxide, propylene oxide, 1-butylene oxide and epichlorohydrin; aromatic alkylene oxides having epoxy group at the end such as styrene oxide; and the like. Among them the aliphatic alkylene oxide, pariticularly propylene oxide is preferably employed.

The molecular weight of the obtained polyalykylene oxide is automatically determined by the amount of the alkylene oxide polymerized to that of the complex catalyst (B), and becomes larger with the increase of amount of the alkylene oxide to the amount of the complex catalyst (B).

The amount of the alkylene oxide can be optionally determined, and is generally 10 to 1000 moles to one mole of the complex catalyst (B). Particularly, there is preferably employed in an amount of 50 to 500 moles to one mole of the complex catalyst (B).

After the polymerization of the alkylene oxide, an polyalkylene oxide having unsaturated groups at the chain ends can be prepared by reacting the polyalkylene oxide with an active halogen-containing compound selected from the group consisting of (c) an organic compound having an active halogen atom and an unsaturated group in one molecule and (d) an organic compound having at least two active halogen atoms in one molecule. Examples of the compound (c) are, for instance, allyl halogen compounds such as allyl chloride, allyl bromide and allyl iodide; benzyl type halogen compounds such as vinylbenzyl chloride and allylbenzyl chloride; acid halogen compounds such as acrylic acid chloride, methacrylic acid chloride and chloroformic acid chloride; and the like. Examples of the compound (d) are, for instance, halogen compounds containing at least two halogen atoms of a benzyl type or an acid halogen type such as bis(chloromethyl)benzene, bis(bromomethyl)benzene, tris(bromomethyl)benzene, adipic acid dichloride and phosgene, and the like. Among them, the compound (c) particularly the allyl halogen compound or acrylic acid chloride is preferably employed. When using the compound (c), the molecular amount of the compound to be reacted is equal or more than that of the complex catalyst (B). When using the compound (d), the reaction is carried out under such a condition that the active halogen of the compound (d) is used approximately in equimolecular amount with the complex catalyst (B).

Non-restrictive embodiments of the process for preparing the polyalkylene oxide having the unsaturated end groups are explained in the followings.

PROCESS (1)

The active hydrogen atom of the organic compound (a) is reacted with the group X of the aluminium porphyrin complex (A) of the formula (IV) wherein X is hydrogen atom or an alkyl group in an equimolecular amount to prepare the complex catalyst (B), and the alkylene oxide is polymerized by using the resulting complex catalyst (B), and then the polymerization is terminated by using the compound (c).

One example of the above process (1) is shown in the following reaction scheme.

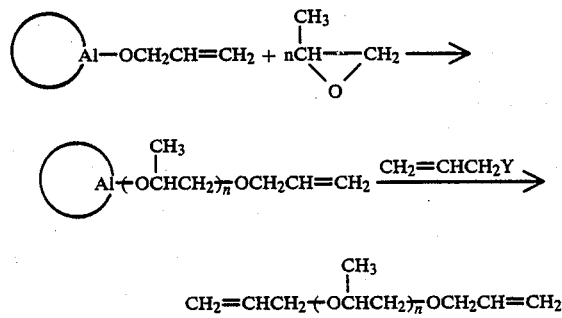

wherein

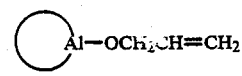

is an aluminium porphyrin complex catalyst derived from allyl alcohol, Y is a halogen atom, n is a positive integer.

PROCESS (2)

After polymerizing the alkylene oxide in the same manner as in the process (1), the polymerization is terminated by using the compound (d).

In this process, the residual group which is obtained by removing a halogen atom from the compound (d) is introduced into the main chain of the polyalkylene oxide to give the polyalkylene oxide having the unsaturated end groups in one step.

One example of the process (2) is shown in the following reaction scheme.

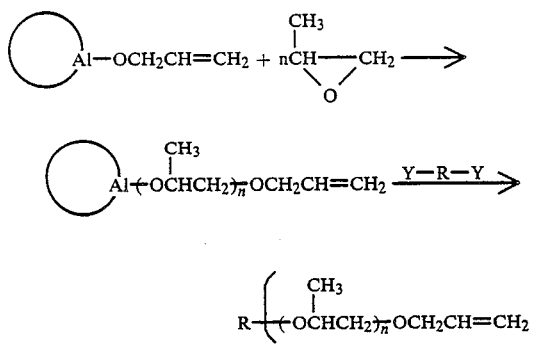

wherein -R- is a divalent organic group.

PROCESS (3)

The organic compound (b) is reacted with the aluminium porphyrin complex (A) wherein X is hydrogen atom or an alkyl group in an equimolecular amount to prepare the complex catalyst (B), and the alkylene oxide is polymerized by using the resulting complex catalyst (B), and then the polymerization is terminated by using the compound (c).

According to the process (3) the polyalkylene oxide having the unsaturated end groups can be obtained in one step.

One example of the process (3) is shown in the following reaction scheme.

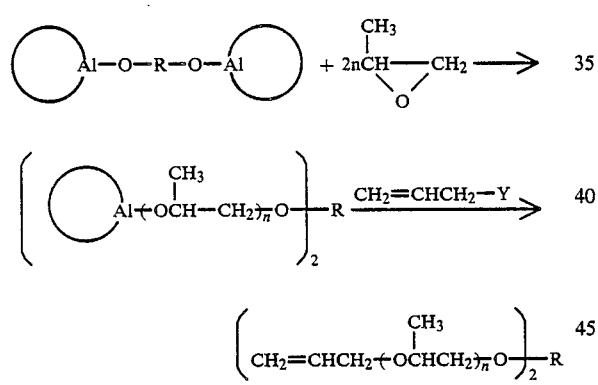

wherein -R- and Y are as defined above.

In combination with the above processes, for introducing the unsaturated group to polyalkylene oxide it is possible to utilize the conventional method as disclosed in USP 3,951,888.

The process (1) is preferable because the amount of the catalyst to be used and the amount of the produced salts can be reduced.

The polyalkylene oxide having unsaturated end groups having a distribution of molecular weight Mw/Mn of not more than 1.5 can be identified in the following method. The structural analysis and the quantitative analysis of the unsaturated end group can be determined by $^{13}C$—NMR, $^1H$—HNR, and IR. The number average molecular weight and the distribution of molecular weight Mw/Mn can be measured by GPC.

The polyalkylene oxide of the present invention can be used, as it is or after converting the unsaturated end groups to other active functional groups, as reactive liquid rubber materials.

The polyalkylene oxide of the present invention can provide cured rubbers having excellent tensile properties, especially elongation, because of a narrow distribution of molecular weight, i.e. not more than 1.5. Especially when the molecular weight of the polyalkylene oxide is not less than 4,000, an improvement in elongation is remarkably obtained. Particularly when the molecular weight is not less than 5,000 and the molecular weight distribution is not more than 1.3, the resulting cured rubber is more excellent in elongation.

The present invention is more specifically described and explained by means of the following Examples. It is to be understood that the present invention is not limited to the Exmaples, and various changes and modifications may be made in the invention without departing from the spirit and scope thereof.

REFERENCE EXAMPLE 1

0.28 ml of triethylaluminium and 1.21 g of $\alpha,\beta,\gamma,\delta$-tetraphenylporphyrin were reacted in 40 ml of methylene chloride at room temperature under nitrogen atmosphere to give a solution containing an aluminium porphyrin complex (A) having the structure of the formula (V). To the solution 1.2 ml of allyl alcohol was added, reacted at room temperature, and then the unreacted allyl alcohol and the solvent were removed therefrom under reduced pressure to give a complex catalyst (1). It is presumed that the complex catalyst (1) had a structure where $R^6$ was allyloxy in the formula (VI).

REFERENCE EXAMPLE 2

The same procedures as in Reference Example 1 were repeated except that 0.14 ml of acrylic acid was used instead of allyl alcohol to give a complex catalyst (2). It is presumed that the complex catalyst (2) had a structure where $R^6$ was

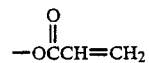

in the formula (VI).

EXAMPLE 1

An egg-plant type flask in which air was replaced with nitrogen gas was charged with 1.21 g of the complex catalyst (1) obtained in Reference Example 1. To the catalyst, 16.4 g of propylene oxide was added, and then polymerized for two days at room temperature with stirring by means of a magnetic stirrer under nitrogen atmosphere. After that the remaining unreacted propylene oxide was removed under reduced pressure. The degree of polymerization was 86 %. After adding 20 ml of allyl bromide and reacting for 32 hours at 70° C., the excess amount of allyl bromide was removed under reduced pressure. Subsequently hexane was added, and the aluminium porphyrin complex catalyst was filtered off, and then hexane was removed form the filtrate to obtain 13.8 g of polypropylene oxide. The molecular weight and the distribution of molecular weight of the polypropylene oxide were measured by GPC. The results are shown in Table 1. The GPC measurement was carried out by using a column charged with a polystyrene gel (available from Toyo Soda Co., Ltd., using tetrahydrofuran as an eluent, and carrying out at an oven temperature of 40° C.). The distribution of molecular weight (MW/Mn) of the polypropylene oxide was very narrow, i.e. 1.12, while the number average molecular weight (MN) was high, i.e. 8.190.

The end group of the polypropylene oxide was analyzed by means of $^1$H—NMR. In the resonance absorptions of the protons of allyloxy

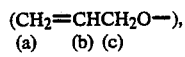

the proton of the carbon (a) was bserved at about δ 5.0 to 5.3 ppm, the proton of the carbon (b) was observed at about δ 5.7 to 5.9 ppm, and the proton of the carbon (c) was observed at about δ3.9 to 4.1 ppm. The proton in methyl of the main chain of the polypropylene oxide was observed at about δ1.0 to 1.1 ppm. The content of the unsaturated end group was calculated on the basis of the ratio of the integral ratios of the methyl proton and the proton bonded to the carbon (a) of the allyloxy. As a result of the calculation by using the number average molecular weight, i.e. 8,190 measured by GPC, it was presumed that about 78 % of the total end groups was allyloxy.

The $^1$H—NMR spectrum chart of the polypropylene oxide is shown in FIG. 1.

EXAMPLE 2

An egg-plane type flask was charged with 3.0 of polypropylene oxide prepared in Example 1. To the polymer 1 ml of 28 % methanol solution of sodium methoxide was added, and was heated to 80° C. with stirring. After removing methanol under reduced pressure 2 ml of allyl chloride was added, and was reacted at 60° C. for two hours, and then at 80° C. for two hours. After cooling the reaction mixture to normal temperature, hexane was added thereto. The mixture was washed with water, and the hexane layer was dried with magnesium sulfate. After filtration, hexane was removed with heating under reduced pressure to give a polymer. The analysis of the end group of the polymer was carried out by means of IR, $^1$H—NMR and $^{13}$C—NMR. In the $^{13}$C—NMR, the resonance absorption of the carbon atom to which hydroxyl group is bonded could not be observed (when propylene oxide is polymerized by using an aluminium porphyrin complex and the product is purified in the presence of water, it has been known that the produced polypropylene oxide has a hydroxyl end group, i.e.

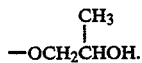

The resonance absorption of the carbon (*) to which hydroxyl group is bonded can be observed near 66.5 ppm by $^{13}$C—NMR). Further the characteristic absorption of hydroxyl group could not be observed near 3,500 cm$^{-1}$ in the IR analysis. These results show the fact that the polymer has little hydroxyl group at the polymer ends.

From the $^1$H—NMR analysis, the integral ratios of methyl on the main chain and of allyloxy at the chain end were measured. Assuming that allyloxy is introduced to the both ends, the presumed molecular weight which was calculated from the integral ratios was 7,500. Since the value almost corresponded to the number average molecular weight which was determined by GPC, the polypropylene oxide had allyloxy at both ends.

Figure 2:
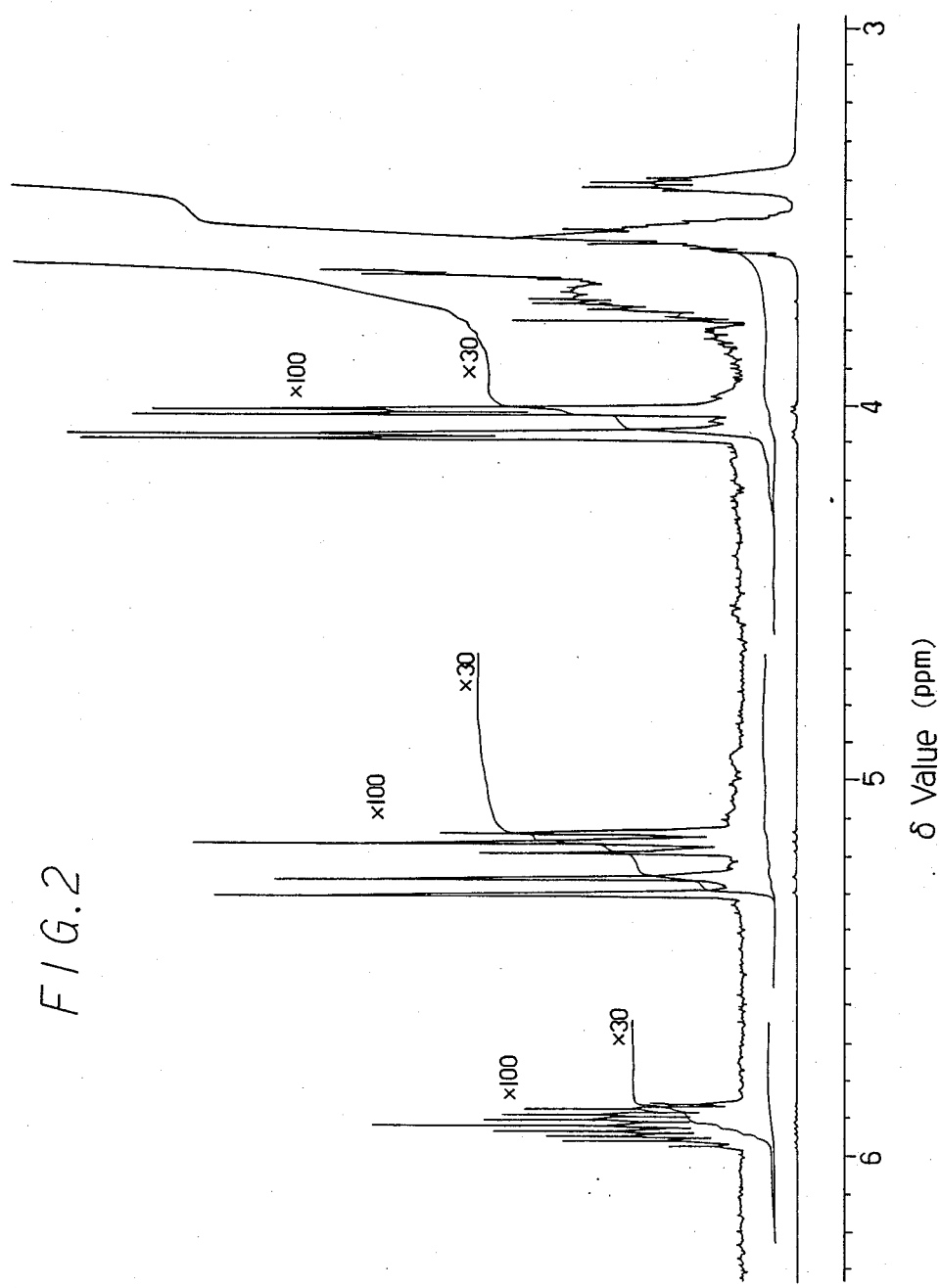

The $^1$H—NMR spectrum chart of the polypropylene oxide is shown in FIG. 2.

EXAMPLE 3

An egg-plant type flask in which air was replaced with nitrogen gas was charged with 1.21 g of the complex catalyst (1) obtained in Reference Example 1. To the catalyst 10 ml of methylene chloride and 2.2 g of propylene oxide was added, and then polymerized for two days at room temperature with stirring by means of a magnetic stirrer under nitrogen atmosphere. After completion of the polymerization methylene chloride were removed under reduced pressure. The degree of polymerizatoin was 100 %. After adding 20 ml of allyl bromide and reacting for 32 hours at 70° C., the excess amount of allyl bromide was removed under reduced pressure. Subsequently hexane was added, and the aluminium porphyrin complex catalyst was filtered off, and then hexane was removed from the filtrate to obtain 2.1 g of polypropylene oxide. The molecular weight and the distribution of molecular weight of the polypropylene oxide were measured by GPC. The results are shown in Table 1.

The analysis of the end group of the polypropylene oxide was carried out by means of $^{13}$C—NMR and IR.

The polypropylene oxide obtained in this Example did not show any resonance absorption due to the carbon atom bonded to hydroxyl group near 66.5 ppm.

Also, as a result of the IR analysis, no absorption was observed near 3500 cm$^{-1}$ in the polypropylene oxide of this Example, such absorption near 3,500 cm$^{-1}$ being a characteristic absorption of hydroxyl group.

These results show the fact that the polypropylene oxide had little hydroxyl group at the chain end.

In addition, in the resonance absorptions of the carbons corresponding to

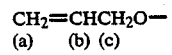

group by the $^{13}$C—NMR, the carbon (a) was observed at 133 to 134 ppm, and the carbon (c) was observed at 70 to 72 ppm. The absorption of the carbon in methyl bonded to the main chain of the polypropylene oxide was observed at 17.3 ppm. The integral ratios of methyl on the main chain and of allyloxy at the chain end were measured. Assuming that allyloxy is introduced to the both ends, presumed molecular weight was determined. Since the presumed value almost corresponded to the number average molecular weight measured by GPC, the polypropylene oxide obtained in this Example had allyloxy at both ends.

EXAMPLE 4

The same procedures as in Example 3 were repeated except that the complex catalyst (2) obtained in Reference Example 2 was employed instead of the complex catalyst (1) and that acrylic acid chloride was employed after the polymerization instead of allyl bromide. The polymerization conditions, the reaction conditions and the analyzed results of the product are shown in Table 1.

The end group of the polymer was analyzed by means of $^{13}$C—NMR and IR. From IR analysis the characteristic absorption of hydroxyl group near 3500 cm$^{-1}$ was not observed, and from $^{13}$C—NMR analysis the resonance absorption of the carbon to which hydroxyl group was bonded was not observed near 66.5 ppm. These results show the fact that the polypropylene oxide had little hydroxyl group at the chain end.

In addition, in the resonance absorptions of the carbons corresponding to

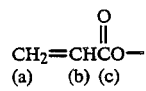
(a) (b) (c)

group by the $^{13}$C—NMR, the carbon (a) was observed at about 130 to 132 ppm, the carbon (b) was observed at about 128 to 130 ppm, and the carbon (c) was observed at about 165 to 166 ppm. In the IR analysis, an absorption of the ester was observed at 1725 cm$^{-1}$, and an absorption of the unsaturated group was observed at 1620 to 1640 cm$^{-1}$. These results show the fact that the unsaturated end group was acryloyloxy.

The integral ratios of methyl on the main chain and of acryloyloxy at the chain end were measured. Assuming that acryloyloxy is introduced to both ends, the presumed molecular weight was determined. Since the presumed value almost corresponded to the number average molecular weight measured by GPC, the polypropylene oxide obtained in this Example had acryloyloxy at both ends.

different in the different recurring units, said main chain having an unsaturated end group of the formula (II):

wherein $R^2$ is a divalent organic group of $C_1$ to $C_8$, a is 0 or 1, and $R^3$ is hydrogen atom or methyl, in an amount of not less than 70% of the total end groups; which consist essentially of:

polymerizing an alkylene oxide in the presence of a complex catalyst prepared by reacting an active hydrogen-containing compound with an aluminium porphyrin complex, and reacting the obtained polymer with an active halogencontaining compound, said active hydrogen-containing compound being an organic compound selected from the group consisting of (a) an organic compound having an unsaturated group and an active hydrogen atom-containing group selected from hydroxyl group and carboxylic group in one molecule, and (b) an organic compound having at least two active hydrogen atom-containing groups selected from hydroxyl group and carboxylic group in one molecule,

TABLE 1

| | Polymerization conditions of alkylene oxide | | | | |
|---|---|---|---|---|---|
| Ex. No. | Kind and amount of complex catalyst | Amount of propylene oxide (g) | Amount of CH$_2$Cl$_2$ (ml) | Polymerization time (day) | Polymerization degree (%) |
| 1 | (1) 1.21 g | 16.4 | 0 | 3 | 86 |
| 3 | (1) 1.21 g | 2.2 | 10 | 2 | 100 |
| 4 | (2) 1.21 g | 2.6 | 5 | 2 | 46 |

| | Reaction conditions of active halogen-containing compound | | | Analysis of the product | |
|---|---|---|---|---|---|
| Ex. No. | Kind and amount (ml) | Reaction temp. (°C.) | Reaction time (hr) | Yield of polymer (g) | Number average molecular weight (Mn) | Molecular weight distribution (Mw/Mn) |
| 1 | CH$_2$=CHCH$_2$Br (20) | 70 | 32 | 13.8 | 8190 | 1.12 |
| 3 | CH$_2$=CHCH$_2$Br (20) | 70 | 32 | 2.1 | 1170 | 1.16 |
| 4 | CH$_2$=CHCOCl (0.8) | room temp. | 8 | 1.1 | 730 | 1.25 |

| Ex. No. | Presumed molecular weight by NMR alalysis |
|---|---|
| 1 | — |
| 3 | 1380 |
| 4 | 650 |

What we claim is:

1. A process for preparing a polyalkylene oxide having a distribution of molecular weight (Mw/Mn) of not more than 1.25, which comprises a main chain consisting essentially of a recurring unit of the formula (I):

wherein $R^1$ is a monovalent group selected form the group consisting of hydrogen atom and a monovalent organic group of $C_1$ to $C_6$, and may be the same or different in the different recurring units, said main chain having an unsaturated end group of the formula (II):

said aluminium porphyrin complex being prepared by reacting an organoaluminium compound and a porphyrin compound, and said active halogen-containing compound being an organic compound selected from the group consisting of (c) an organic compound having an active halogen atom and an unsaturated group in one molecule, and (d) an organic compound having at least two active halogen aotms in one molecule, with the proviso that when said active hydrogen-containing compound is compound (b) then said active halogen-containing compound must be compound (c).

* * * * *